(No Model.)

R. LUNDELL.
ELECTRIC MOTOR.

No. 549,876. Patented Nov. 12, 1895.

Witnesses
C. E. Ashley
H. W. Lloyd

Inventor
Robert Lundell
By his Attorney
Charles J. Kintner

UNITED STATES PATENT OFFICE.

ROBERT LUNDELL, OF BROOKLYN, ASSIGNOR, BY DIRECT AND MESNE ASSIGNMENTS, TO THE ELECTRIC EXPERIMENTAL AND DEVELOPING COMPANY, OF NEW YORK, N. Y.

ELECTRIC MOTOR.

SPECIFICATION forming part of Letters Patent No. 549,876, dated November 12, 1895.

Application filed March 2, 1893. Serial No. 464,329. (No model.)

*To all whom it may concern:*

Be it known that I, ROBERT LUNDELL, a citizen of the United States, residing at Brooklyn, in the county of Kings and State of New York, have made a new and useful Improvement in Electric Motors, of which the following specification is a full, clear, and exact description.

My invention is directed especially to that type of electric motors known in the art as "alternating-current" motors; and its objects are, first, the production of a motor of this special type having a minimum amount of windings or energizing-coils; second, the construction of such a motor at a minimum cost.

To this end my invention consists in the novel electric motor hereinafter described, which is so designed and constructed as to have its energizing coil or coils carried wholly by the rotary part, while the field-magnet or stationary part is of magnetic material and is not provided with any windings or energizing-coils whatever, the rotary part being provided, also, with commutator or current-collecting brushes connected directly with the current-mains and adapted to short-circuit those coils of the armature which are passing out of the field as said armature rotates.

Figure 1:
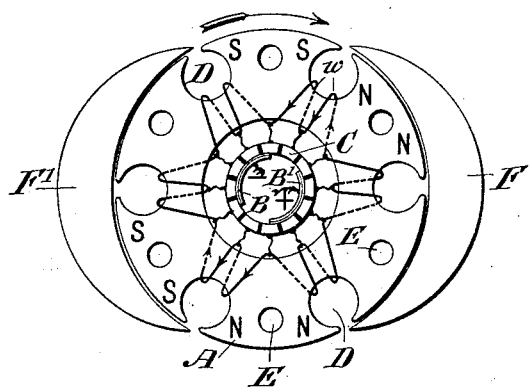
Figure 2:
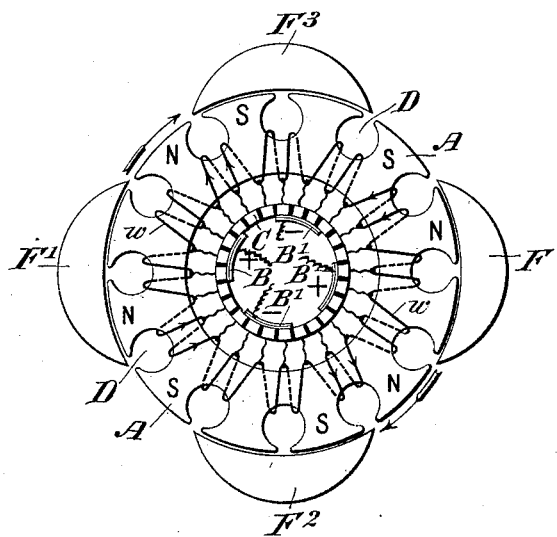

Figure 1 of the accompanying drawings is a diagrammatic view of one form of a motor, illustrating the application of the novel principles of my invention. Fig. 2 is a similar view of a modified form thereof, but of multipolar construction.

Referring first to Fig. 1, F and F' are field-magnet poles, constructed, preferably, of laminated iron or equivalent magnetic material, held together in the usual manner.

A is the armature, shown as of Gramme type, laminated also, D D, &c., being holes (like those found in the Wenstrohm armature) in which are wound the energizing-coils $w$ $w$, connected to the commutator-strips C C in multiple, as usual.

E E are openings extending through the armature-core from end to end for sustaining the bolts which carry the armature on its axis through spider-arms. (Not shown.)

The apparatus so far described is well known.

My invention consists in adapting this structure to alternate-current uses with the simplest possible changes. I effect this result by providing bridging collectors or brushes B and B', which are connected directly to the current-mains and which are so constructed that they rest upon or short-circuit two or more coils of the armature at one time, their location being such that those coils which are in the act of rotating out of the field on each side are short-circuited, while the remaining coils which are at the same instant in the act of rotating into the field are not short-circuited, but convey the energizing-currents, which magnetize the armature-poles then advancing into the magnetic field of the stationary field-magnets.

B and B', the current-collectors, here shown as curved brushes, fit accurately the inner or outer faces of the commutator-strips C C and are connected to a source of alternating-current supply. (Not shown.)

In the motor illustrated in Fig. 1 the effective magnetizing-coils for the instant are the upper right and lower left, and the current effect is illustrated in the two coils by arrows, the resultant magnetic effect being indicated by S S and N N, thereby creating two independent temporary magnets, which tend to set up magnetic short-circuits, respectively, between the stationary field-poles F and F' and the parts thus magnetized. Tendency to rotation, therefore, results in the direction of the arrows. At the next instant, however, when the commutator-strips move off the collectors B and B' a new energizing effect is set up in the next pair of coils in the rear, now thrown into circuit, while the coils last effected are now short-circuited. Consequently continuous rotation will result, the successive pairs of coils being alternately energized and short-circuited or demagnetized in sequence.

In the modified form shown in Fig. 2 I have illustrated the application of this novel principle of successively engergizing the coils and demagnetizing or shunting them as applicable to a multipolar structure, there being in this instance four field-magnet poles F F' and $F^2$ $F^3$, arranged in diametrical pairs, the collector connections being so arranged as to shunt the current around the coils or convey it through them in pairs, as will be clearly apparent on inspection of the drawings, the arrows indicating the active coils and the letters N N and S S the effective armature-poles rotating toward the field-poles in the direction indicated by the curved arrows.

The brushes or collectors B B' are carried in the usual manner on a brush-rocker and may be adjusted to any desired point, the location or lead more or less in either direction to the right or left of a given line determining the direction of rotation of the armature.

I do not limit myself to any special form or arrangement of collector-brushes B B' when combined with the coils of the armature or rotary part and stationary field-magnet poles of magnetic material, but without magnetizing or energizing coils, as I believe it is broadly new with me to combine these features without relation to any special type or form of motor.

Having thus described my invention, what I claim, and desire to secure by Letters Patent of the United States, is—

1. An alternating current electric motor having one or more field magnet poles of magnetic material and without energizing coils, a rotary part having multiple arc windings connected to a commutator or current collector and one or more pairs of current collectors or brushes adapted to bridge two or more of said coils during the time they are passing the field magnet poles substantially as described.

2. An alternating current electric motor having a simple iron or other magnetic field magnet and a rotary part, the latter provided with windings of the Gramme type and two current collectors bridging each two or more coils as they pass by the field magnet substantially as described.

3. An alternating current electric motor having a field magnet of iron or equivalent magnetic material only; an armature with multiple arc coils all connected to a commutator and two current collectors each of which bridges or bears upon two or more commutator strips at the same time as the coils pass the poles of the field magnet substantially as described.

4. An alternating current electric motor having laminated iron field magnets only, a laminated iron armature core wound with multiple arc coils connected to a commutator and one or more pairs of current collectors adapted each to bridge or short circuit the coils of the armature as they pass by the faces of the field magnet poles substantially as described.

In testimony whereof I have hereunto subscribed my name this 27th day of February, 1893.

ROBERT LUNDELL.

Witnesses:
C. J. KINTNER,
V. LUER.